No. 699,779. Patented May 13, 1902.
J. L. VAN HOOK.
COMBINED HEATING AND COOKING STOVE.
(Application filed June 22, 1901.)
(No Model.) 2 Sheets—Sheet 1.
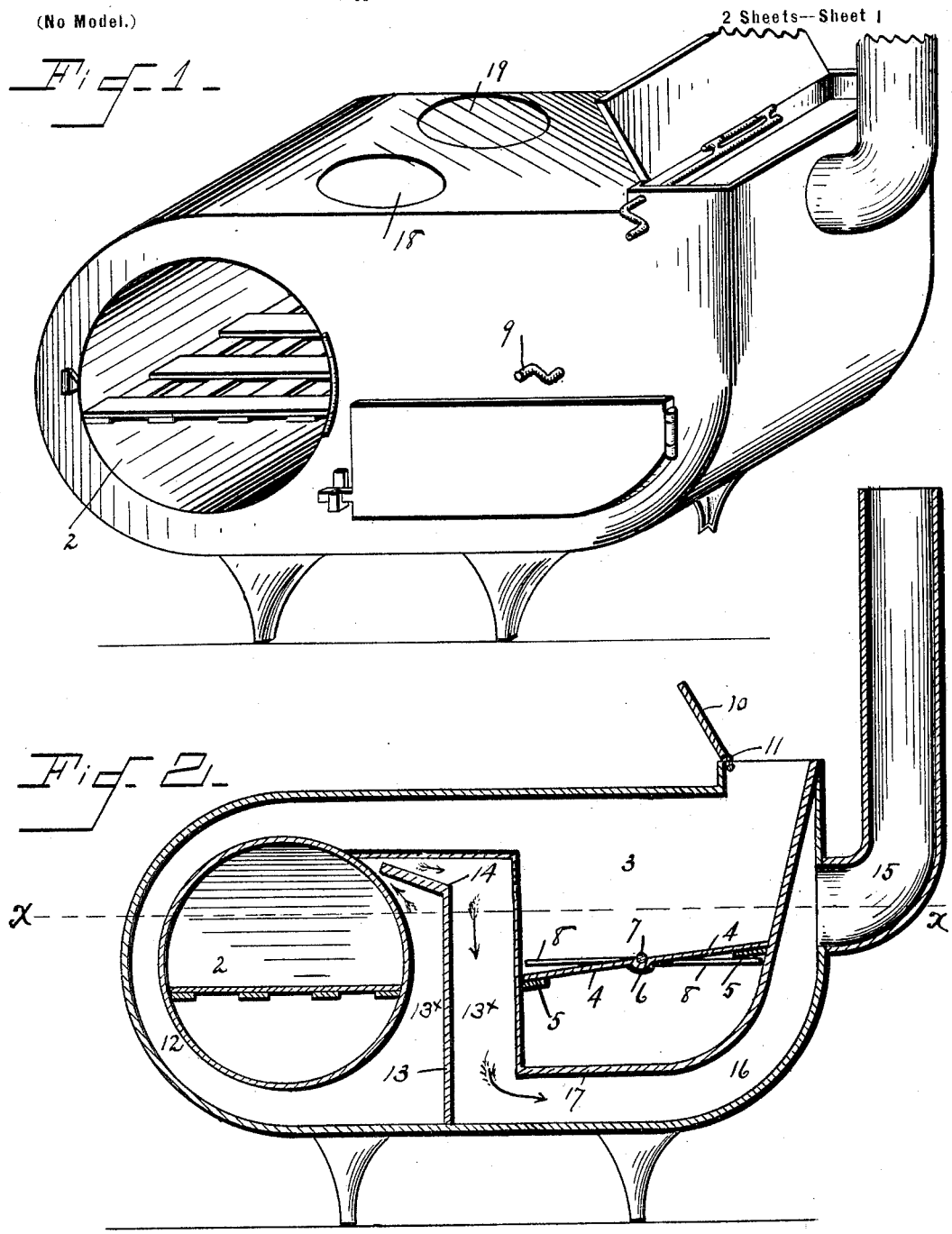
Witnesses
George Hilton
T. J. Miller
Inventor
J. L. VAN HOOK.
By W. J. Fitzgerald & Co.
Attorneys.

No. 699,779. Patented May 13, 1902.
J. L. VAN HOOK.
COMBINED HEATING AND COOKING STOVE
(Application filed June 22, 1901.)
(No Model.) 2 Sheets—Sheet 2.
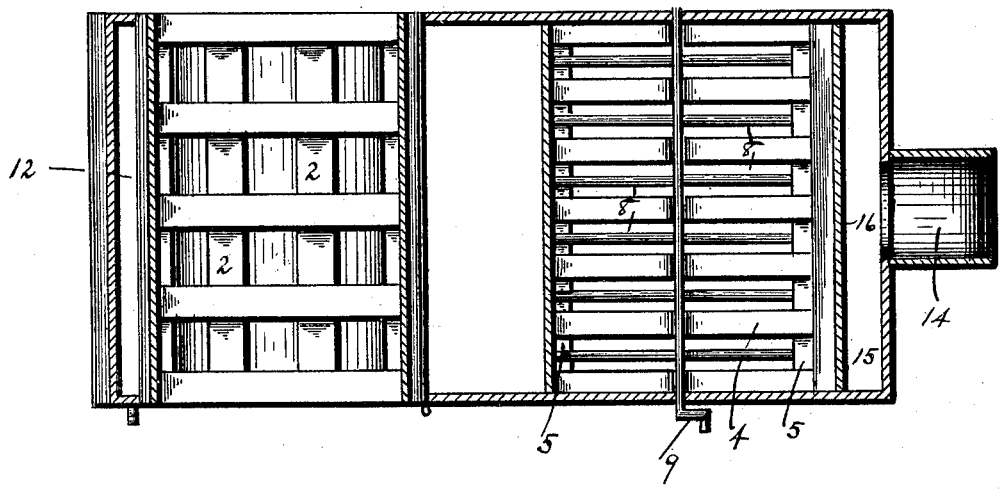
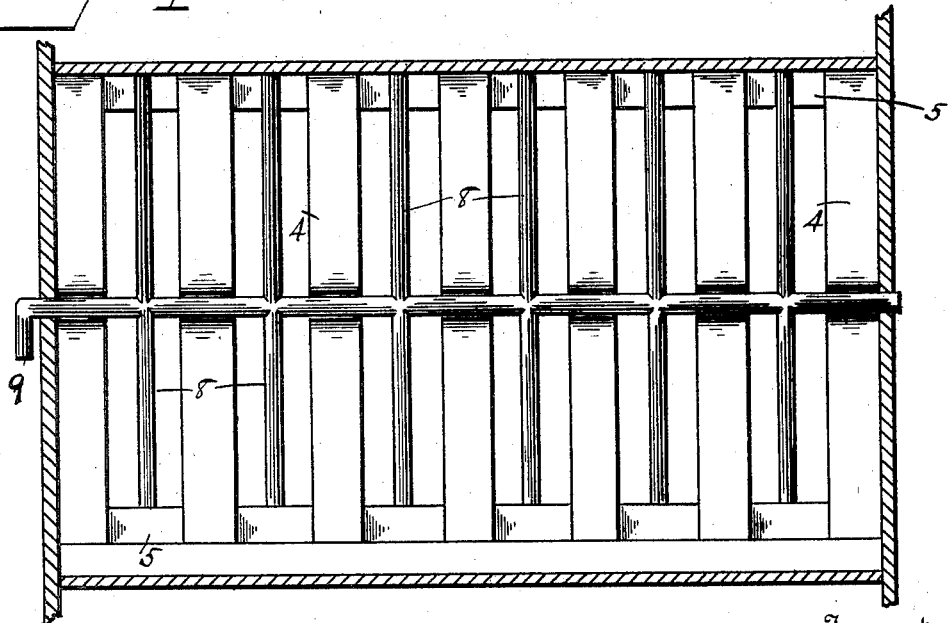
Witnesses
Inventor
J. L. VAN HOOK
Attorneys

UNITED STATES PATENT OFFICE.

JOHN LLOYD VAN HOOK, OF FLOYDADA, TEXAS.

COMBINED HEATING AND COOKING STOVE.

SPECIFICATION forming part of Letters Patent No. 699,779, dated May 13, 1902.

Application filed June 22, 1901. Serial No. 65,571. (No model.)

*To all whom it may concern:*

Be it known that I, JOHN LLOYD VAN HOOK, a citizen of the United States, residing at Floydada, in the county of Floyd and State of Texas, have invented certain new and useful Improvements in a Combined Heating and Cooking Stove; and I do hereby declare the following to be a full, clear, and exact description of the invention, such as will enable others skilled in the art to which it appertains to make and use the same.

My invention has relation to combined heating and cooking stoves; and my object is to provide a stove which may be operated by using a light chaffy form of fuel, as hay, straw, cornstalks, and other form of vegetable matter, my prime object being to provide that the combustion-chamber shall be placed fully under the control of the operator and at times rendered practically air-tight.

Other objects and advantages will be made fully apparent from the following specification, considered in connection with the accompanying drawings, in which—

Figure 1 is a perspective view of my invention complete ready for use. Fig. 2 is a longitudinal central vertical section of Fig. 1. Fig. 3 is a horizontal section taken on line $xx$ of Fig. 2. Fig. 4 is a detail view, on a slightly-enlarged scale, showing a plan view of the movable and stationary grate-bars.

In order to conveniently refer to the several features of my invention and the parts designed to coöperate therewith, numerals will be employed, of which 1 indicates the sides of the body portion of my improved stove, which is provided with the oven 2 and the combustion-chamber 3. Mounted in the combustion-chamber 3 is a series of stationary grate-bars 4, properly supported in position, as by the brackets 5, attached to a contiguous part of the wall forming the combustion-chamber.

I prefer to slightly incline the bars 4 and provide each of them with a centrally-disposed recess 6, in which is disposed the grate-bar proper, 7, to which I attach a series of movable grate-bars 8, which are of sufficient width to extend loosely between the stationary bars 4, and since the bar 7 is adapted to extend through a contiguous part of the side walls 1 the said shaft 7 and bars 8 may be readily moved by means of the controlling-handle 9, as illustrated in Figs. 1 and 3.

By reference to Fig. 2 it will be observed that the combustion-chamber is provided with the door 10, properly hinged in position, as indicated by the numeral 11, whereby the fuel may be introduced into the combustion-chamber from above.

The products of combustion pass from the combustion-chamber in the direction indicated by the arrow in Fig. 2 and pass around the oven 2 through the narrow channel 12 and from thence around the oven up the channel $13^\times$ divided by the diaphragm 13 above the diaphragm 13 and its lateral extension 14, and thence down the channel $13^\times$ on the other side of said diaphragm into the chimney 15 through the channel 16. The course taken by the heat and products of combustion is practically entirely around the oven 2, thereby insuring that the heat will be utilized to the greatest possible extent.

Immediately below the grate-bars 4 and 8 I provide the ash-receptacle, said receptacle being separated from the channel 16 by the plate 17. Suitable openings 18 and 19 may be provided in the upper portion of the stove, as is common, adapted to accommodate cooking utensils of various kinds.

My improved combined heating and cooking stove may be made of any preferred material deemed suitable for the purpose, though it will in many instances be found most desirable to form the stove of heavy sheet metal, the parts of which shall be properly joined together, so as to make the interior practically air-tight.

By the arrangement just described it will be observed that the line of travel for the heat and products of combustion is extended to the maximum degree and that the heat may therefore be effectively utilized both for the purpose of heating a room and also for cooking.

While I have described the preferred construction and combination of parts necessary to materialize my invention, I desire to comprehend in this application all substantial equivalents and substitutes.

Having thus fully described my invention, what I claim as new, and desire to secure by Letters Patent, is—

1. The herein-described combined heating and cooking stove comprising a body portion having a circular oven and a combustion-chamber; suitable partition-walls between the oven and the fire-box adapted to cause the products of combustion to extend entirely around said oven and thence under the ash-receiver to the chimney and a suitable opening in the upper portion of the combustion-chamber through which the fuel may be introduced, all substantially as specified and for the purpose set forth.

2. In a stove of the character described the combination with the body portion having combustion-chamber and circular oven, and a vertical channel between the same, of a deflector-plate at the top of said channel, the combustion-chamber having an opening for the introduction of the fuel and the chimney communicating with the body at the end opposite the oven outside the combustion-chamber, as set forth.

3. In a combined cooking and heating stove, a body portion having a combustion-chamber and a circular oven, a channel formed between the combustion-chamber and oven and closed at its top, a chimney communicating with the space around the combustion-chamber, and a diaphragm in the said channel having deflector at its upper end, whereby the products of combustion are forced to travel over the said channel around the oven up one side of said diaphragm and down the other and beneath the bottom of the combustion-chamber into the chimney, substantially as shown and described.

In testimony whereof I affix my signature in presence of two witnesses.

JOHN LLOYD VAN HOOK.

Witnesses:
HUGH HARKY,
S. L. MOLLOY.